US009432737B2

(12) United States Patent
Yamagishi

(10) Patent No.: US 9,432,737 B2
(45) Date of Patent: Aug. 30, 2016

(54) TERMINAL DEVICE, SERVER DEVICE, INFORMATION PROCESSING METHOD, PROGRAM, AND LINKED APPLICATION SUPPLYING SYSTEM

(71) Applicant: Sony Corporation, Tokyo (JP)

(72) Inventor: Yasuaki Yamagishi, Kanagawa (JP)

(73) Assignee: Sony Corporation (JP)

( * ) Notice: Subject to any disclaimer, the term of this patent is extended or adjusted under 35 U.S.C. 154(b) by 85 days.

(21) Appl. No.: 14/356,763

(22) PCT Filed: Nov. 7, 2012

(86) PCT No.: PCT/JP2012/078824
§ 371 (c)(1),
(2) Date: May 7, 2014

(87) PCT Pub. No.: WO2013/073430
PCT Pub. Date: May 23, 2013

(65) Prior Publication Data
US 2014/0310759 A1 Oct. 16, 2014

(30) Foreign Application Priority Data
Nov. 14, 2011 (JP) ................................ 2011-248494

(51) Int. Cl.
*H04N 7/173* (2011.01)
*H04N 21/4722* (2011.01)
(Continued)

(52) U.S. Cl.
CPC ........ *H04N 21/4722* (2013.01); *H04N 21/235* (2013.01); *H04N 21/278* (2013.01);
(Continued)

(58) Field of Classification Search
CPC ........... H04N 21/4722; H04N 21/235; H04N 21/278; H04N 21/44008; H04N 21/443; H04N 21/478; H04N 21/6175; H04N 21/6581; H04N 21/8405
See application file for complete search history.

(56) References Cited

U.S. PATENT DOCUMENTS 7,907,746 B2    3/2011   Oki
8,312,489 B2   11/2012   Nakamura et al.
(Continued)

FOREIGN PATENT DOCUMENTS

JP    2006-050237 A    2/2006
JP    2006-237878 A    9/2006
(Continued)

OTHER PUBLICATIONS

International Search Report dated Jan. 8, 2013.
(Continued)

*Primary Examiner* — Nathan Flynn
*Assistant Examiner* — Alfonso Castro
(74) *Attorney, Agent, or Firm* — Lerner, David, Littenberg, Krumholz & Mentlik, LLP

(57) ABSTRACT

The present disclosure relates to a terminal device, a server device, an information processing method, a program, and a linked application supplying system, which are capable of executing an application in conjunction with progress of content being viewed at a user's home.

The terminal device of the present disclosure is characterized in including a database cache unit that acquires and holds reference data which is held in a database of the server device, and a response generation unit that identifies content of an extraction source of signature data included in a second query in response to the second query transmitted from a separate terminal device belonging to a common network, by referring to the reference data in the database cache unit, and generates a second response to be returned to the separate terminal device, including at least the application identifier representing an application to be executed in conjunction with the identified content. The terminal device of the present disclosure can be applied to a TV receiver.

7 Claims, 11 Drawing Sheets

(51) Int. Cl.
*H04N 21/278* (2011.01)
*H04N 21/44* (2011.01)
*H04N 21/443* (2011.01)
*H04N 21/61* (2011.01)
*H04N 21/658* (2011.01)
*H04N 21/8405* (2011.01)
*H04N 21/235* (2011.01)
*H04N 21/478* (2011.01)

(52) U.S. Cl.
CPC ...... *H04N21/443* (2013.01); *H04N 21/44008* (2013.01); *H04N 21/478* (2013.01); *H04N 21/6175* (2013.01); *H04N 21/6581* (2013.01); *H04N 21/8405* (2013.01)

(56) References Cited

U.S. PATENT DOCUMENTS 8,520,979 B2    8/2013    Conwell
2005/0058319 A1    3/2005    Rhoads et al.
2005/0210526 A1*    9/2005    Levy ................ H04N 7/17318 725/113
2009/0106297 A1*    4/2009    Wright ................ H04H 60/37
2010/0023874 A1    1/2010    Frohwein
2012/0240142 A1*    9/2012    Rose ................ H04H 20/38 725/14

FOREIGN PATENT DOCUMENTS

JP    2007-174108 A    7/2007
JP    2007-259043 A    10/2007
WO    2010-090946 A1    8/2010

OTHER PUBLICATIONS

Extended European Search Report for EP Application No. 12849334.3, dated Jun. 11, 2015.

* cited by examiner

TERMINAL DEVICE, SERVER DEVICE, INFORMATION PROCESSING METHOD, PROGRAM, AND LINKED APPLICATION SUPPLYING SYSTEM

CROSS-REFERENCE TO RELATED APPLICATION

The present application is a national phase entry under 35 U.S.C. §371 of International Application No. PCT/JP2012/078824 filed Nov. 7, 2012, published on May 23, 2013 as WO 2013/073430 A1, which claims priority from Japanese Patent Application No. JP 2011-248494 filed in the Japanese Patent Office on Nov. 14, 2011.

TECHNICAL FIELD

The present disclosure relates to a terminal device, a server device, an information processing method, a program, and a linked application supplying system, and more particularly to a terminal device, a server device, an information processing method, a program, and a linked application supplying system, which are intended to be capable of executing an application program in conjunction with progress of not only a television program but also any content being viewed.

BACKGROUND ART

For example, it has been considered that information relating to a TV program (hereinafter, simply referred to as a program) (a cast, a synopsis, a preview for next episode, and the like) and information not directly related to the program but useful for viewers (news, weather forecast, traffic information, and the like) are displayed on a screen for the viewers of the television (TV) program.

In order to realize this, a command for acquiring and activating a dedicated application program (hereinafter, abbreviated as an application) may be transmitted in conjunction with the progress of the program to a TV receiver or the like. In fact, this has been already realized in Japan, Europe and others, by transmitting the command and application, using a band for a data broadcast in a TV broadcast signal (for example, see PTL 1).

CITATION LIST

Patent Literature

PTL 1: Japanese Unexamined Patent Application Publication No. 2006-50237

SUMMARY OF INVENTION

Technical Problem

In contrast, in the U.S., a band for a data broadcast is not formed in a TV broadcast signal and an alternative method thereof is not established, so that executing an application in conjunction with progress of a program has not been realized.

In addition, in the U.S., most households view programs through a CATV or an IPTV rather than directly receive and view the programs by TV receivers. Since the CATV and the IPTV extract only video and audio of the programs from a TV broadcast so as to be distributed, it is not ensured that data broadcast signals including data relating to an application are transmitted to viewers even if the band for the data broadcast is formed in the TV broadcast signal in the U.S.

The present disclosure has been made in view of such a circumstance, and is intended to be capable of executing an application in conjunction with progress of content being viewed at a user's home.

Solution to Problem

A terminal device which is a first aspect of the present disclosure includes: an extraction unit that extracts, from content being reproduced, signature data representing characteristics of the content; a query generation unit that generates a first query including at least the extracted signature data; a communication unit that transmits the generated first query to a server device and receives a first response which is returned by the server device in response to the first query; an application execution unit that acquires and executes an application corresponding to an application identifier included in the received first response; a database cache unit that acquires and holds reference data in which signature data that is held in a database of the server device and represents characteristics of content extracted from the content is associated with a content identifier representing the content of an extraction source and an application identifier representing an application to be executed in conjunction with the content; and a response generation unit that identifies content of an extraction source of signature data included in a second query in response to the second query transmitted from a separate terminal device belonging to a common network, by referring to the reference data in the database cache unit, and generates a second response to be returned to the separate terminal device, including at least the application identifier representing an application to be executed in conjunction with the identified content.

The response generation unit further identifies content of an extraction source of signature data included in the first query which is generated by the query generation unit, by referring to the reference data in the database cache unit, and generates the third response including at least the application identifier representing an application to be executed in conjunction with the identified application, and the application execution unit further can acquire and execute an application corresponding to an application identifier included in the generated third response.

The query generation unit generates the first query including at least the extracted signature data and an extraction time stamp representing a timing when the signature data is extracted, and the application execution unit or an application executed by the application execution unit can acquire associated metadata which is selected by the server device based on the extraction time stamp which is included in the received second response, and perform a predetermined process.

The terminal device can be built into a reproduction device which reproduces content, and the terminal device which is the first aspect of the present disclosure can further include a content supply unit that supplies all pieces of content which are reproduced by the reproduction device, to the extraction unit.

In an information processing method which is the first aspect of the present disclosure, the information processing method of a terminal device includes, by the terminal device, an extraction step of extracting, from content to be reproduced, signature data representing characteristics of the content; a query generation step of generating a first query including at least the extracted signature data; a communication step of transmitting the generated first query to a server device and of receiving a first response which is returned by the server device in response to the first query; an application execution step of acquiring and executing an application corresponding to an application identifier included in the received first response; a database cache step of acquiring reference data in which signature data that is held in a database of the server device and represents characteristics of content extracted from the content is associated with a content identifier representing the content of an extraction source and an application identifier representing an application to be executed in conjunction with the content, and of holding the acquired reference data in a database cache unit; and a response generation step of identifying content of an extraction source of signature data included in a second query in response to the second query transmitted from a separate terminal device belonging to a common network, by referring to the reference data in the database cache unit, and of generating a second response to be returned to the separate terminal device, including at least the application identifier representing an application to be executed in conjunction with the identified content.

A program which is the first aspect of the present disclosure causing a computer to function as: an extraction unit that extracts, from content being reproduced, signature data representing characteristics of the content; a query generation unit that generates a first query including at least the extracted signature data; a communication unit that transmits the generated first query to a server device and receives a first response which is returned by the server device in response to the first query; an application execution unit that acquires and executes an application corresponding to an application identifier included in the received first response; a database cache unit that acquires and holds reference data in which signature data that is held in a database of the server device and represents characteristics of content extracted from the content is associated with a content identifier representing the content of an extraction source and an application identifier representing an application to be executed in conjunction with the content; and a response generation unit that identifies content of an extraction source of signature data included in a second query in response to the second query transmitted from a separate terminal device belonging to a common network, by referring to the reference data in the database cache unit, and generates a second response to be returned to the separate terminal device, including at least the application identifier representing an application to be executed in conjunction with the identified content.

In the first aspect of the present disclosure, reference data in which signature data representing characteristics of content extracted from the content is associated with a content identifier representing the content of an extraction source and an application identifier representing an application to be executed in conjunction with the content is acquired and held in a database cache unit, content of an extraction source of signature data included in the second query is identified in response to the second query transmitted from a separate terminal device belonging to a common network, by referring to the reference data in the database cache unit, and a second response to be returned to the separate terminal device, including at least the application identifier representing an application to be executed in conjunction with the identified content is generated.

A server device which is a second aspect of the present disclosure includes: a database that holds reference data in which signature data representing characteristics of content extracted from the content is associated with a content identifier representing the content of an extraction source and an application identifier representing an application to be executed in conjunction with the content; a response generation unit that identifies content of an extraction source of signature data included in a query transmitted from a terminal device, by referring to the reference data, and generates a response including at least the application identifier representing an application to be executed in conjunction with the identified content; a transmission unit that transmits the generated response to the terminal device; and a supply unit that supplies the reference data which is held in the database to the terminal device through a predetermined network.

The database holds reference data in which signature data representing characteristics of content extracted from the content is associated with a content identifier representing the content of an extraction source, an application identifier representing an application to be executed in conjunction with the content, and associated metadata processed in the application, and the response generation unit identifies content of an extraction source of signature data included in a query transmitted from the terminal device, by referring to the reference data, and generates the response including at least the application identifier representing an application to be executed in conjunction with the identified content and the associated metadata.

The response generation unit identifies content of an extraction source of signature data included in a query transmitted from the terminal device, by referring to the reference data, and generates the response including at least the application identifier representing an application to be executed in conjunction with the identified content and the associated metadata which is selected based on an extraction time stamp included in the query.

The response generation unit can further generate the response including a content identifier representing the identified content.

In an information processing method which is the second aspect of the present disclosure, the information processing method of a server device includes, by the server device, a reception step of receiving a query transmitted from a terminal device; a response generation step of identifying content of an extraction source of signature data included in the received query, by referring to reference data in which signature data representing characteristics of content extracted from the content is associated with a content identifier representing the content of an extraction source and an application identifier representing an application to be executed in conjunction with the content, and of generating a response including at least the application identifier representing an application to be executed in conjunction with the identified content; a transmission step of transmitting the generated response to the terminal device; and a supply step of supplying the reference data to the terminal device through a predetermined network.

A program which is the second aspect of the present disclosure causing a computer to function as: a database that holds reference data in which signature data representing characteristics of content extracted from the content is associated with a content identifier representing the content of an extraction source and an application identifier representing an application to be executed in conjunction with the content; a response generation unit that identifies content of an extraction source of signature data included in a query transmitted from a terminal device, by referring to the reference data, and generates a response including at least the application identifier representing an application to be executed in conjunction with the identified content; and a transmission unit that transmits the generated response to the terminal device; and a supply unit that supplies the reference data which is held in the database to the terminal device through a predetermined network.

In the second aspect of the present disclosure, reference data in which signature data representing characteristics of content extracted from the content is associated with a content identifier representing the content of an extraction source and an application identifier representing an application to be executed in conjunction with the content is held in a database, and the reference data which is held in the database is supplied to the terminal device through a predetermined network.

In a linked application supplying system which is a third aspect of the present disclosure, the linked application supplying system configured with a terminal device and a server device, in which the terminal device includes: an extraction unit that extracts, from content being reproduced, signature data representing characteristics of the content; a query generation unit that generates a first query including at least the extracted signature data; a communication unit that transmits the generated first query to a server device and receives a first response which is returned by the server device in response to the first query; an application execution unit that acquires and executes an application corresponding to an application identifier included in the received first response; a database cache unit that acquires and holds reference data in which signature data that is held in a database of the server device and represents characteristics of content extracted from the content is associated with a content identifier representing the content of an extraction source and an application identifier representing an application to be executed in conjunction with the content; and a response generation unit that identifies content of an extraction source of signature data included in a second query in response to the second query transmitted from a separate terminal device belonging to a common network, by referring to the reference data in the database cache unit, and generates a second response to be returned to the separate terminal device, including at least the application identifier representing an application to be executed in conjunction with the identified content, and in which the server device includes: a database that holds the reference data; a response generation unit that identifies content of an extraction source of signature data included in the first query transmitted from the terminal device, by referring to the reference data, and generates the first response including at least the application identifier representing an application to be executed in conjunction with the identified content; a transmission unit that transmits the generated first response to the terminal device; and a supply unit that supplies the reference data which is held in the database to the terminal device through a predetermined network.

In the third aspect of the present disclosure, by the server device, reference data in which signature data representing characteristics of content extracted from the content is associated with a content identifier representing the content of an extraction source and an application identifier representing an application to be executed in conjunction with the content is held in a database, the reference data which is held in the database is supplied to the terminal device through a predetermined network. Then, by the terminal device, the reference data which is held in a database of a server device is acquired and held in the database cache unit, content of an extraction source of signature data included in the second query is identified in response to the second query transmitted from a separate terminal device belonging to a common network, by referring to the reference data in the database cache unit, and a second response to be returned to the separate terminal device, including at least the application identifier representing an application to be executed in conjunction with the identified content is generated.

Advantageous Effects of Invention

According to the first aspect of the present disclosure, it is possible to execute an application in conjunction with progress of content being viewed at a user's home.

According to the second aspect of the present disclosure, it is possible to execute an application in conjunction with progress of content being viewed at a user's home.

According to the third aspect of the present disclosure, it is possible to execute an application in conjunction with progress of content being viewed at a user's home.

DESCRIPTION OF EMBODIMENTS

Hereinafter, the best mode for implementing the present disclosure (hereinafter, referred to as an embodiment) will be described with reference to drawings.

[1. First Configuration Example of Linked Application Supplying System]

Figure 1:
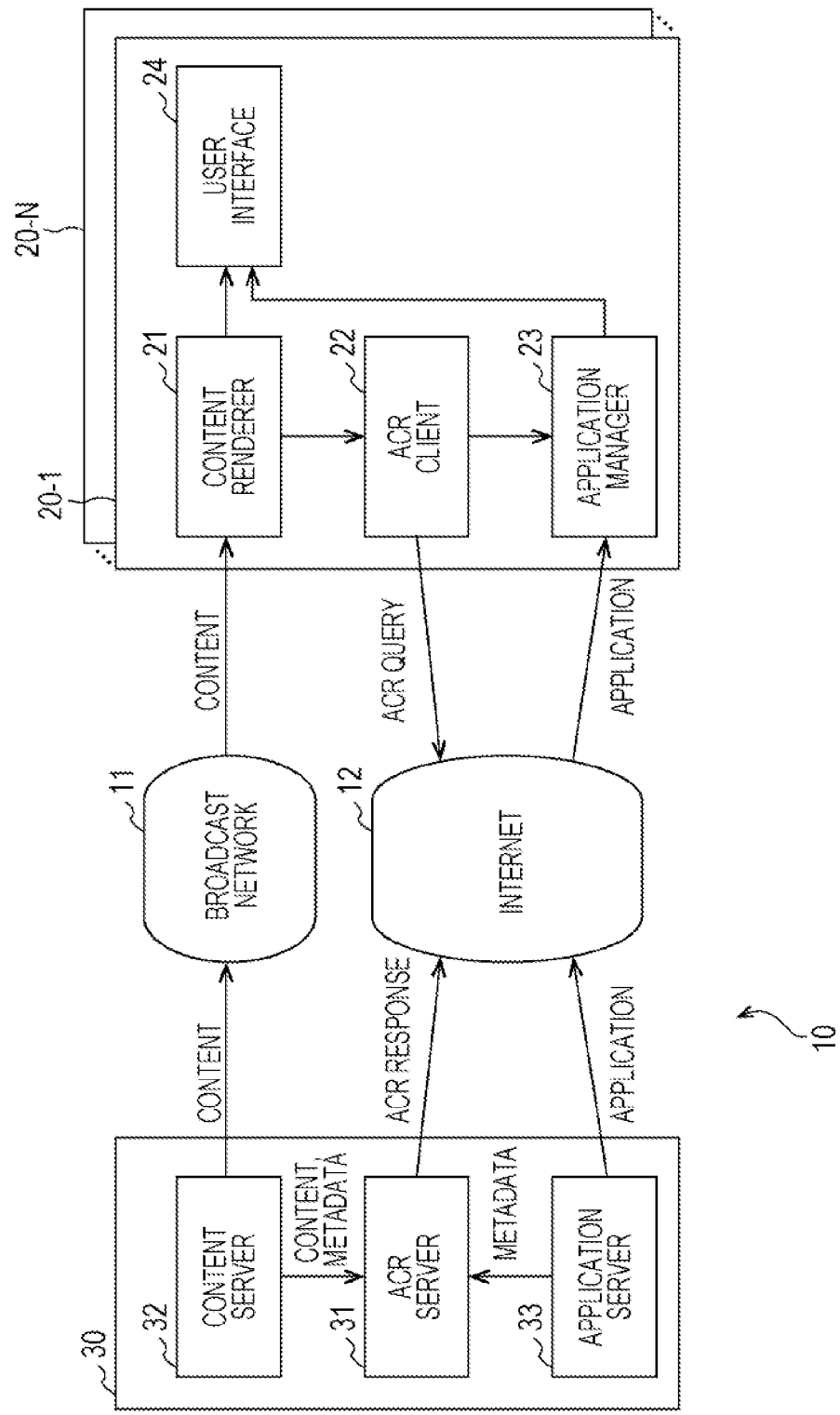
FIG. 1 is a block diagram of a first configuration example of a linked application supplying system which is an embodiment of the present disclosure.

FIG. 1 shows a first configuration example of a linked application supplying system which is an embodiment of the present disclosure.

The linked application supplying system 10 is intended to execute an application in conjunction with progress of content being viewed by a user in a TV receiver or the like. By executing the application, it is possible to display some pieces of information (a cast, a synopsis, and a preview for next episode) relating to content being viewed and other pieces of information (news, weather forecast, traffic information, and the like) which are not directly related to the content but useful for the user on a screen, or to realize a quiz or a vote in which the viewers can participate.

In addition, the content herein is intended to include all pieces of AV content such as a program being broadcasted over a TV broadcast network, a CATV network, an IPTV network, or the like, a program reproduced from a state in which the program has been recorded, a video reproduced from package media, and a video distributed over the Internet.

The linked application supplying system 10 includes a plurality of terminal devices 20-1 to 20-N and a supply device 30. In addition, it is assumed that each of the terminal devices 20-1 to 20-N, while being built into each content reproduction device represented by a TV receiver, is disposed in a general house, or the like. Hereinafter, when there is no need to distinguish individual terminal devices 20-1 to 20-N, they are simply referred to as the terminal device 20.

[Description of Terminal Device 20]

The terminal device 20 is connected to the supply device 30 through a broadcast network 11 such as the TV broadcast network, the CATV network, and the IPTV network, and the Internet 12.

The terminal device 20 includes a content renderer 21, an ACR client 22, an application manager 23, and a user interface 24.

The content renderer 21 has a function to acquire content from outside so as to be reproduced. Further, the content renderer 21 transfers all content displayed on a display such as a TV receiver having a built-in terminal device 20 so as to be supplied to the ACR client 22. In other words, not only a program received in a tuner of the TV receiver having a built-in terminal device 20, but also content which is input through various types of input terminals (such as a HDMI terminal) of the TV receiver are transferred and supplied to the ACR client 22.

The ACR client 22 extracts signature data representing the characteristics of the content from content which is input by the content renderer 21, in a predetermined sampling period. Here, a method of extracting the signature data is arbitrary. For example, a watermark which has been embedded in advance in the content may be extracted and taken as signature data, or a fingerprint may be calculated and taken as signature data.

Even if a resolution of content, an aspect ratio, a bit rate, and an encoding format are converted, it is possible to obtain the same signature data before and after conversion by using the fingerprint as the signature data. Accordingly, identification accuracy at the time of the identification of the content based on the signature data can be increased.

Further, the ACR client 22 generates an ACR query including the extracted signature data, and transmits the generated ACR query to an ACR server 31 of the supply device 30 through the Internet 12. Further, the ACR client 22 receives and holds an ACR response which is returned by the ACR server 31 in response to the ACR query from the ACR client 22. Further, the ACR client 22 analyzes the held ACR response and causes the application manager 23 to execute an application corresponding to the content being viewed.

The application manager 23 acquires an application corresponding to the content being viewed from an application server 33 through the Internet 12 and executes the application, in response to a control from the ACR client 22. Further, the application manager 23 has an associated metadata acquisition Application Program Interface (API) and acquires associated metadata corresponding to the application being executed from the ACR client 22, using the associated metadata acquisition API.

The user interface 24 causes various types of information displayed by the application being executed to be displayed on the display. Further, the user interface 24 receives an operation of the user for the application being executed.

[Description of Supply Device 30]

The supply device 30 includes the ACR server 31, a content server 32, and the application server 33.

The ACR server 31 generates and holds in advance ACR reference data in which the signature data extracted from each of various pieces of content capable of being viewed on the terminal device 20 in a predetermined sampling period is associated with an application identifier, associated metadata, or the like. The ACR server 31 generates an ACR response in response to the ACR query transmitted from the ACR client 22 of the terminal device 20 and returns the ACR response to the ACR client 22 through the Internet 12.

The content server 32 distributes content through the broadcast network 11 and supplies the ACR server 31 with the distributed content and the associated metadata.

In addition, the ACR server 31, the content server 32, and the application server 33 constituting the supply device 30 may be disposed while being concentrated at one location, or may be disposed in a dispersed manner. Further, the ACR server 31, the content server 32, and the application server 33 may be combined appropriately to configure the supply device 30.

[Detailed Configuration Example of ACR Client 22]

Figure 2:
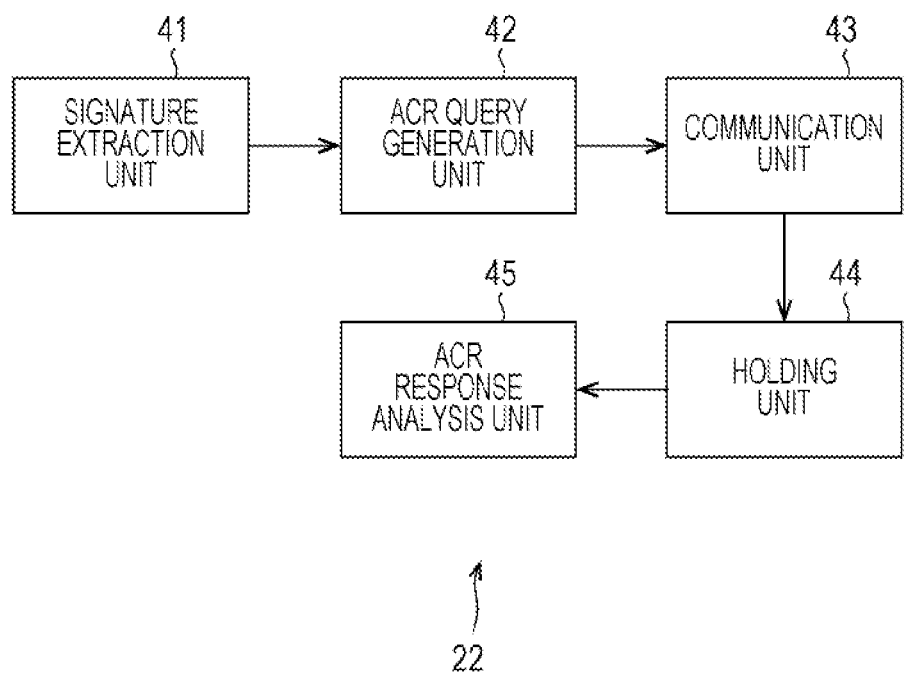
FIG. 2 is a block diagram of a configuration example of an Automatic Content Recognition (ACR) client.

FIG. 2 shows a detailed configuration example of the ACR client 22 constituting the terminal device 20.

The ACR client 22 includes a signature extraction unit 41, an ACR query generation unit 42, a communication unit 43, a holding unit 44, and an ACR response analysis unit 45.

Figure 3:
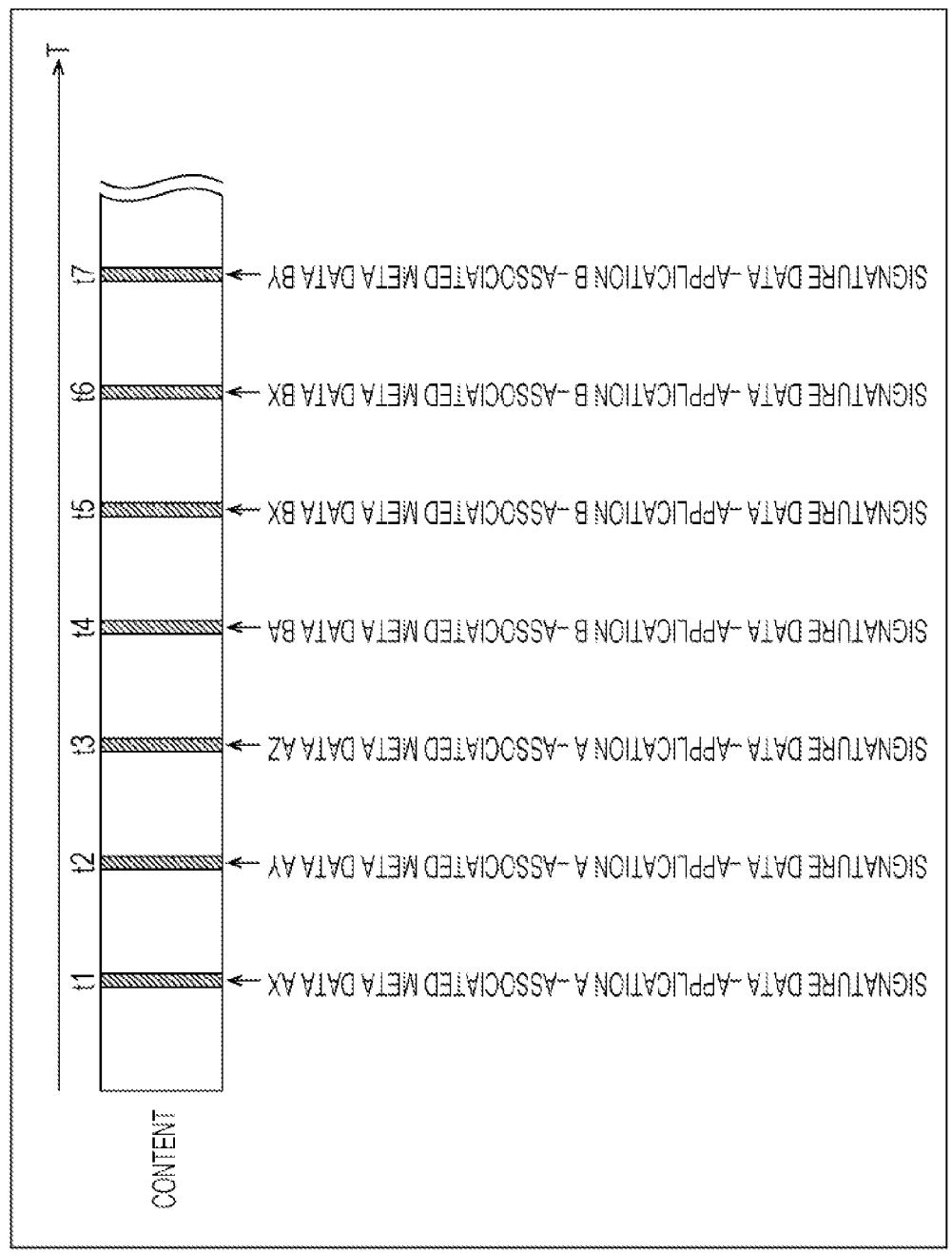
FIG. 3 is a diagram showing an outline of periodically extracting signature data from content.

As shown in FIG. 3, the signature extraction unit 41 extracts signature data representing the characteristics from the content which is input from the content renderer 21, according to a predetermined extraction method in a predetermined sampling period and outputs the extracted signature data to the ACR query generation unit 42. In addition, the extraction period and the sampling period of the signature data may be set arbitrarily by the user.

Whenever signature data is input from the signature extraction unit 41, the ACR query generation unit 42 generates an ACR query including the signature data. The data structure of the ACR query will be described with reference to FIG. 5.

The communication unit 43 transmits the ACR query generated by the ACR query generation unit 42 to the ACR server 31 of the supply device 30 through the Internet 12. Further, the communication unit 43 receives the ACR response returned from the ACR server 31 and outputs the received ACR response to the holding unit 44.

The holding unit 44 holds the ACR response received by the communication unit 43, and supplies the associated metadata included in the ACR response, in response to a request from the associated metadata acquisition API of the application manager 23. In addition, when the ACR response including the associated metadata requested from the associated metadata acquisition API is not held in the holding unit 44, the ACR query may be generated again and transmitted to the ACR server 31 such that the ACR response including the requested associated metadata may be acquired.

The ACR response analysis unit 45 analyzes the ACR response which is returned from the ACR server 31 and is held in the holding unit 44, specifies an application to be executed in conjunction with the content being viewed, and notifies the application manager 23 of the specified application.

[Detailed Configuration Example of ACR Server 31]

Figure 4:
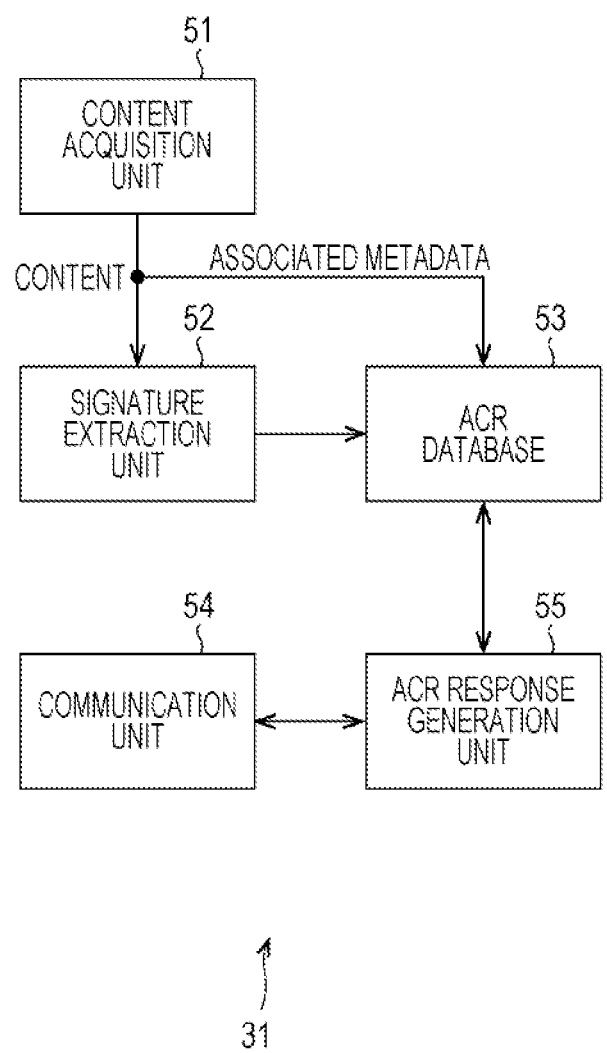
FIG. 4 is a block diagram showing a configuration example of an ACR server.

FIG. 4 shows a detailed configuration example of the ACR server 31 constituting the supply device 30.

The ACR server 31 includes a content acquisition unit 51, a signature extraction unit 52, an ACR database 53, a communication unit 54, and an ACR response generation unit 55.

The content acquisition unit 51 acquires various types of content which can be viewed on the terminal device 20 and the associated metadata from the content server 32, or the like, and supplies the signature extraction unit 52 and the ACR database 53 with the acquired content and the acquired associated metadata, respectively.

As shown in FIG. 3, the signature extraction unit 52 extracts signature data representing the characteristics from the content which is input from the content acquisition unit 51, according to a predetermined extraction method, in a predetermined sampling period and outputs the extracted signature data to the ACR database 53.

The ACR database 53 generates ACR reference data by associating each piece of signature data from the signature extraction unit 52 with the content of an extraction source, an application to be linked, associated metadata used in the application, and the like, and holds the generated ACR reference data. In addition, the ACR reference data which is generated in advance may be supplied to and held in the ACR database 53. The data structure of the ACR reference data will be described later with reference to FIG. 6.

The communication unit 54 receives the ACR query transmitted from the ACR client 22 of the terminal device 20 through the Internet 12 and outputs the received ACR query to the ACR response generation unit 55. Further, the communication unit 54 transmits the ACR response generated in the ACR response generation unit 55 to the ACR client 22 of the terminal device 20 through the Internet 12.

The ACR response generation unit 55 identifies content corresponding to the signature data included in the ACR query transmitted from the ACR client 22 of the terminal device 20 by referring to the ACR reference data of the ACR database 53. Further, the ACR response generation unit 55 generates an ACR response including a content identifier as an identification result, an application identifier representing an application to be executed in conjunction with the progress of the identified content, and associated metadata used by the application or the like so as to be output to the notification unit 54.

In addition, when the ACR response generation unit 55 generates the ACR response, a communication delay of the ACR response in the Internet 12 is estimated based on an extracted local time stamp 75 (FIG. 5) included in the ACR query, and associated metadata stored in the ACR response is selected in view of a processing time of the ACR response generation unit 55 itself. The data structure of the ACR response will be described with reference to FIG. 7.

[Data Structure of ACR Query]

Figure 5:
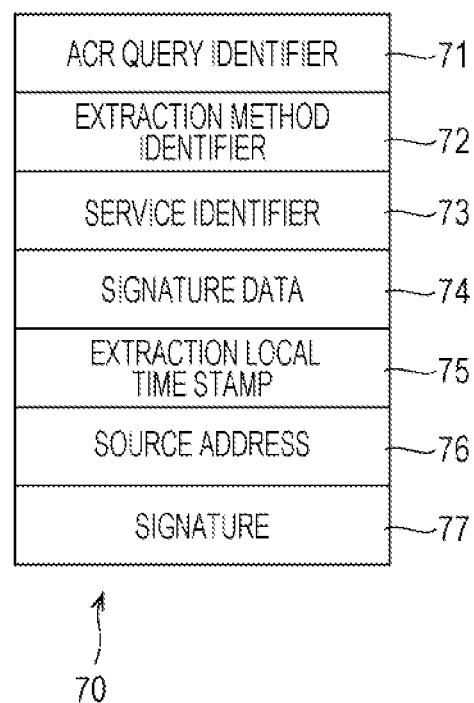
FIG. 5 is a diagram showing a data structure of an ACR query.

FIG. 5 shows the data structure of the ACR query generated in the ACR query generation unit 42 of the ACR client 22.

The ACR query 70 includes an ACR query identifier 71, an extraction method identifier 72, a service identifier 73, signature data 74, an extracted local time stamp 75, a source address 76, and a signature 77.

The ACR query identifier 71 is information for specifying the ACR query 70. The extraction method identifier 72 is information for specifying an extraction method used at the time of extracting the signature data 74. When there are a plurality of services which perform identification of the content based on the signature data 74, the service identifier 73 is information for selecting a service for processing the ACR query 70.

The signature data 74 is what is extracted from the content in the signature extraction unit 41. The extracted local time stamp 75 is intended to represent a timing when the signature data 74 is extracted in the signature extraction unit 41, and is represented by a time that a local system clock of the terminal device 20 indicates.

The source address 76 is information indicating a terminal device 20 sending the ACR query 70, in other words, a return destination of the ACR response generated by the ACR server 31 in response to the ACR query 70. The signature 77 is intended to prevent the ACR query 70 from being falsified in a communication path. In addition, the falsification may be prevented by encrypting and transmitting the entire ACR query 70.

[Data Structure of ACR Reference Data]

Figure 6:
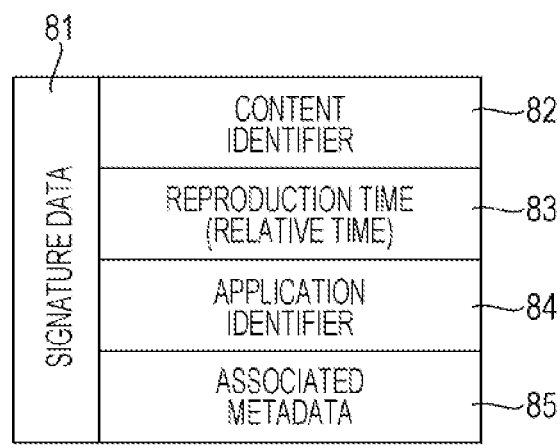
FIG. 6 is a diagram showing a data structure of ACR reference data.

FIG. 6 shows a data structure of ACR reference data which is held in the ACR database 53 of the ACR server 31.

A content identifier 82, a reproduction time 83, an application identifier 84, and associated metadata 85 are recorded in association with the signature data 81 in the ACR reference data 80.

The signature data 81 is what is extracted from the content in the signature extraction unit 52. The content identifier 82 is information representing content of the extraction source of the signature data 81. The reproduction time 83 is intended to represent a progress timing of content when the signature data 81 is extracted from content represented by the content identifier 82, and for example, is represented by an elapse time from the beginning of content represented by the content identifier 82.

The application identifier 84 is information indicating an application to be executed in conjunction with the progress timing indicated by a reproduction time 83 of content indicated by the content identifier 82. The associated metadata 85 includes various types of information (such as data to be displayed) used in the application indicated by the application identifier 84.

[Data Structure of the ACR Response]

Figure 7:
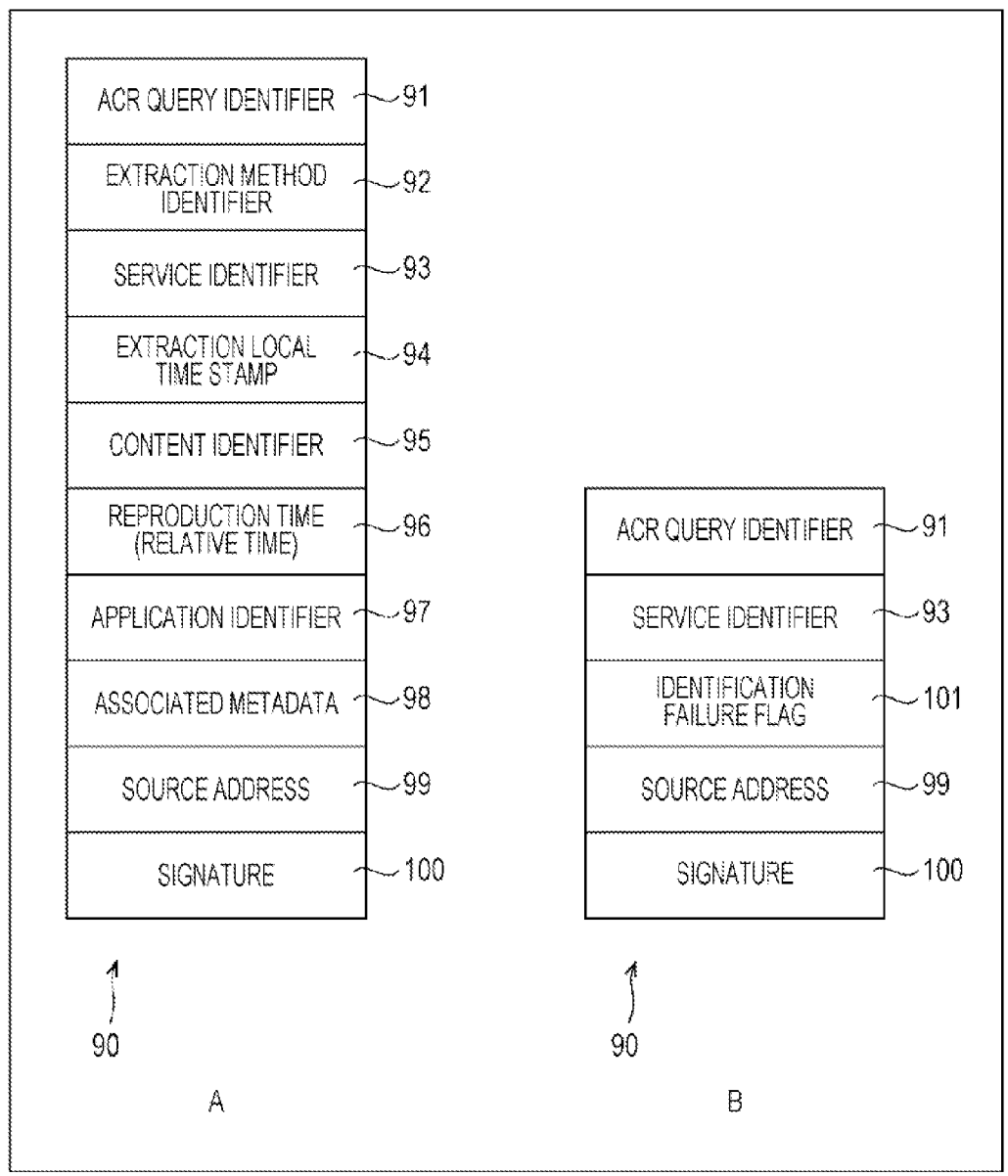
FIG. 7 is a diagram showing a data structure of an ACR response.

FIG. 7 shows a data structure of an ACR response generated in the ACR response generation unit 55 of the ACR server 31. In addition, A in FIG. 7 shows an ACR response when content corresponding to the signature data 74 of the ACR query 70 transmitted from the ACR client 22, in other words, content being viewed in the terminal device 20 is identified, by referring to the ACR reference data 80 in the ACR database 53. B in FIG. 7 shows an ACR response when content is not identified.

The ACR response 90 when the content being viewed in the terminal device 20 is identified (A in FIG. 7) includes an ACR query identifier 91, an extraction method identifier 92, a service identifier 93, an extracted local time stamp 94, a content identifier 95, a reproduction time 96, an application identifier 97, associated metadata 98, a source address 99, and a signature 100.

The ACR response 90 when the content being viewed in the terminal device 20 is not identified (B in FIG. 7) includes an ACR query identifier 91, a service identifier 93, a source address 99, a signature 100, and an identification failure flag 101.

The ACR query identifier 91 to the extracted local time stamp 94 are what specify an ACR query 70 which is a trigger to generate the ACR response 90, and the ACR query identifier 71 to the service identifier 73 of the ACR query 70, and the extracted local time stamp 75 are diverted therefor.

The content identifier 95 is information indicating the identified content, and the content identifier 82 of the ACR reference data 80 is diverted therefor. The reproduction time 96 is information indicating a progress timing of the identified content, and the reproduction time 83 of the ACR reference data 80 is diverted therefor.

The application identifier 97 is information specifying an application to be executed according to the progress timing indicated by the reproduction time 96 of the identified content, and the application identifier 84 of the ACR reference data 80 is diverted therefor. In addition, the application identifier 97 includes information indicating an acquisition destination (application server 33) of the application.

The associated metadata 98 includes various types of information (such as data to be displayed) used according to the progress timing indicated by the reproduction time 96 in an application indicated by the application identifier 97, and the associated metadata 85 of the ACR reference data 80 is diverted therefor. In addition, the application identifier 97 and the associated metadata 98 are changed during a period from the beginning to the end of the content, thereby allowing the content to be activated in conjunction with the progress of the content to be changed or information to be displayed to be switched.

The source address 99 is information indicating the ACR server 31 transmitting the ACR response 90. The signature 100 is intended to prevent the ACR response 90 from being falsified in a communication path. In addition, the falsification may be prevented by encrypting and transmitting the entire ACR response 90.

The identification failure flag 101 is intended to indicate that the content corresponding to the signature data 74 of the ACR query 70 cannot be identified as a result of referring to the ACR reference data 80.

[Operation by Linked Application Supplying System 10]

Figure 8:
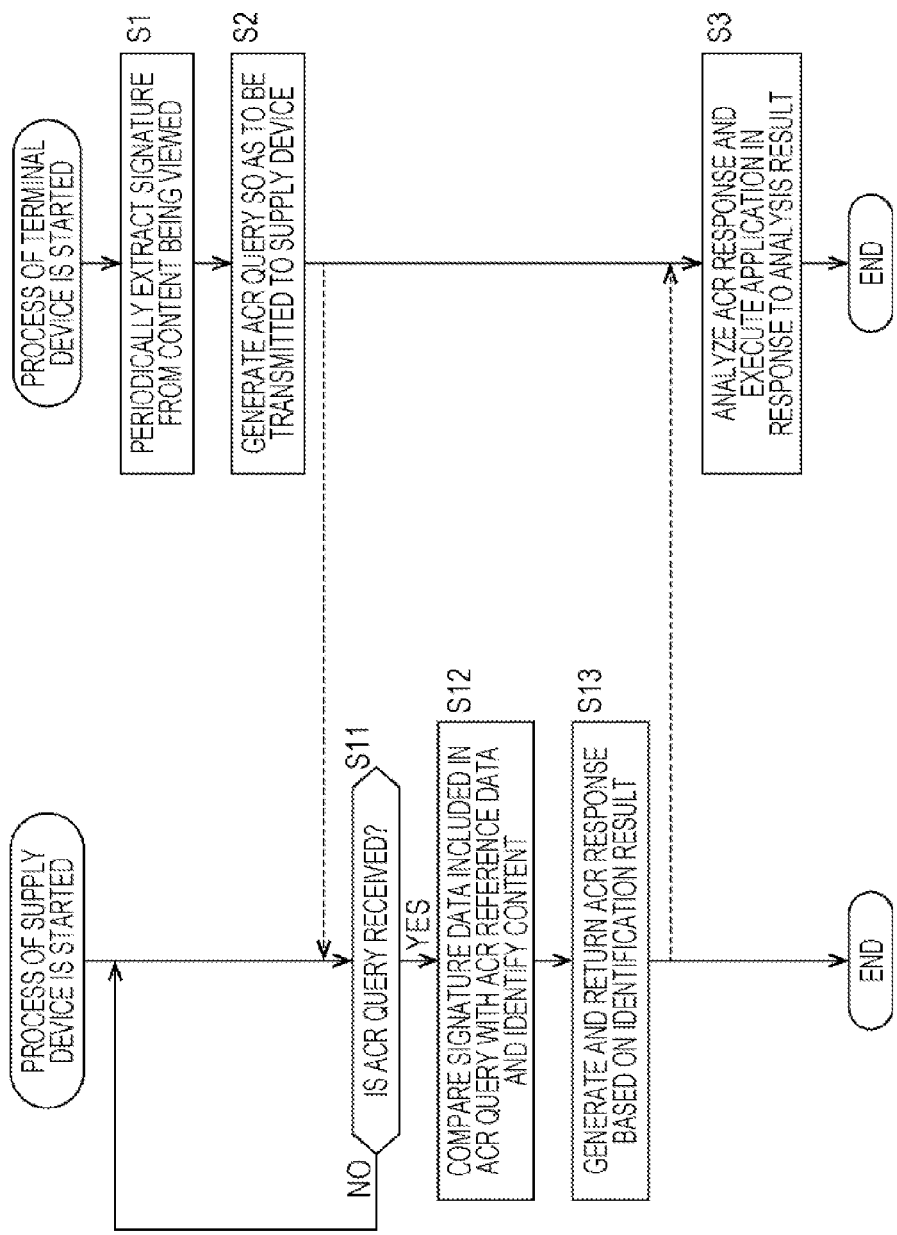
FIG. 8 is a flowchart describing an operation of the linked application supplying system shown in FIG. 1.

FIG. 8 is a flowchart describing an operation by the linked application supplying system 10 shown in FIG. 1.

In addition, as a premise of the operation description, it is assumed that ACR reference data 80 which has been generated in advance is held in the ACR database 53 of the ACR server 31 constituting the supply device 30.

If content is reproduced by a TV receiver built into the terminal device 20, in other words, the user views the content by the TV receiver, in step S1, the content renderer 21 of the terminal device 20 transfers the content being viewed to be output to the ACR client 22. In the ACR client 22, the signature extraction unit 41 extracts signature data from the content being viewed in a predetermined sampling period and outputs the extracted signature data to the ACR query generation unit 42.

In step S2, the ACR query generation unit 42 generates an ACR query 70 including the signature data which is input from the signature extraction unit 41 and outputs the generated ACR query 70 to the communication unit 43. The communication unit 43 transmits the generated ACR query 70 to the ACR server 31 of the supply device 30 through the Internet 12.

On the other hand, in step S11, the ACR server 31 of the supply device 30 is on standby until the communication unit 54 receives the ACR query 70 transmitted from the ACR client 22 of the terminal device 20. If the ACR query 70 is received by the communication unit 54, the process proceeds to step S12.

In step S12, the ACR response generation unit 55 identifies the content corresponding to the signature data 74 included in the received ACR query 70, by referring to the ACR reference data 80 of the ACR database 53.

In step S13, the ACR response generation unit 55 generates an ACR response 90 in response to an identification result of the content. In other words, when the content corresponding to the signature data 74 included in the ACR query 70 is identified, the ACR response 90 shown by A in FIG. 7 is generated, but when the content is not identified, the ACR response 90 shown by B in FIG. 7 is generated. The communication unit 54 transmits the generated ACR response 90 to the ACR client 22 of the terminal device 20 through the Internet 12.

If the ACR response 90 is received and held by the ACR client 22, in step S3, the ACR response analysis unit 45 analyzes the held ACR response 90 to specify the application to be executed in association with the progress of the content being viewed, and notifies the application manager 23 of the application identifier 97 and the content identifier 95. According to the notification, the application manager 23 acquires the application represented by the application identifier 97 from the application server 33 through the Internet 12 and executes the acquired application.

Further, the application manager 23 gives the content identifier 95 and the application identifier 97 as arguments to any associated metadata acquisition API so as to acquire the associated metadata 98 corresponding to the executed application from the ACR client 22.

At this time, the associated metadata acquisition API notifies the application manager 23 of the local time stamp at the time of acquiring the associated metadata 98 from the ACR client 22 as well as the extracted local time stamp 94 which is acquired from the ACR response 90 held in the ACR client 22. The application manager 23 and the application executed by the application manager 23 can process the associated metadata in view of a time difference between the two local time stamps.

The afore-mentioned operations are repeatedly performed while the content is viewed. Thus, this allows the operations of the application in conjunction with the progress of the content being viewed to be performed.

Then, for example, it is possible to display information related to the content, to realize a quiz or a vote of a viewer-participating type, and to recommend or download other pieces of content, depending on the type of the application to be linked.

However, in the case of the linked application supplying system 10 shown in FIG. 1, if a large number of terminal devices 20 access the ACR server 31 and transmit ACR queries at the same time through the Internet 12, a heavy load is applied to the ACR server 31. As a result, it takes a long time from when the terminal devices 20 transmit the ACR queries until the terminal devices 20 receive the ACR responses, and thus a time until the application is executed in conjunction with the progress of the content increases. Accordingly, a mechanism for dispersing the processing load of the ACR server 31 is needed.

Therefore, a second configuration example of the linked application supplying system which is configured to disperse the processing load of the ACR server 31 will be described.

[2. Second Configuration Example of Linked Application Supplying System]

Figure 9:
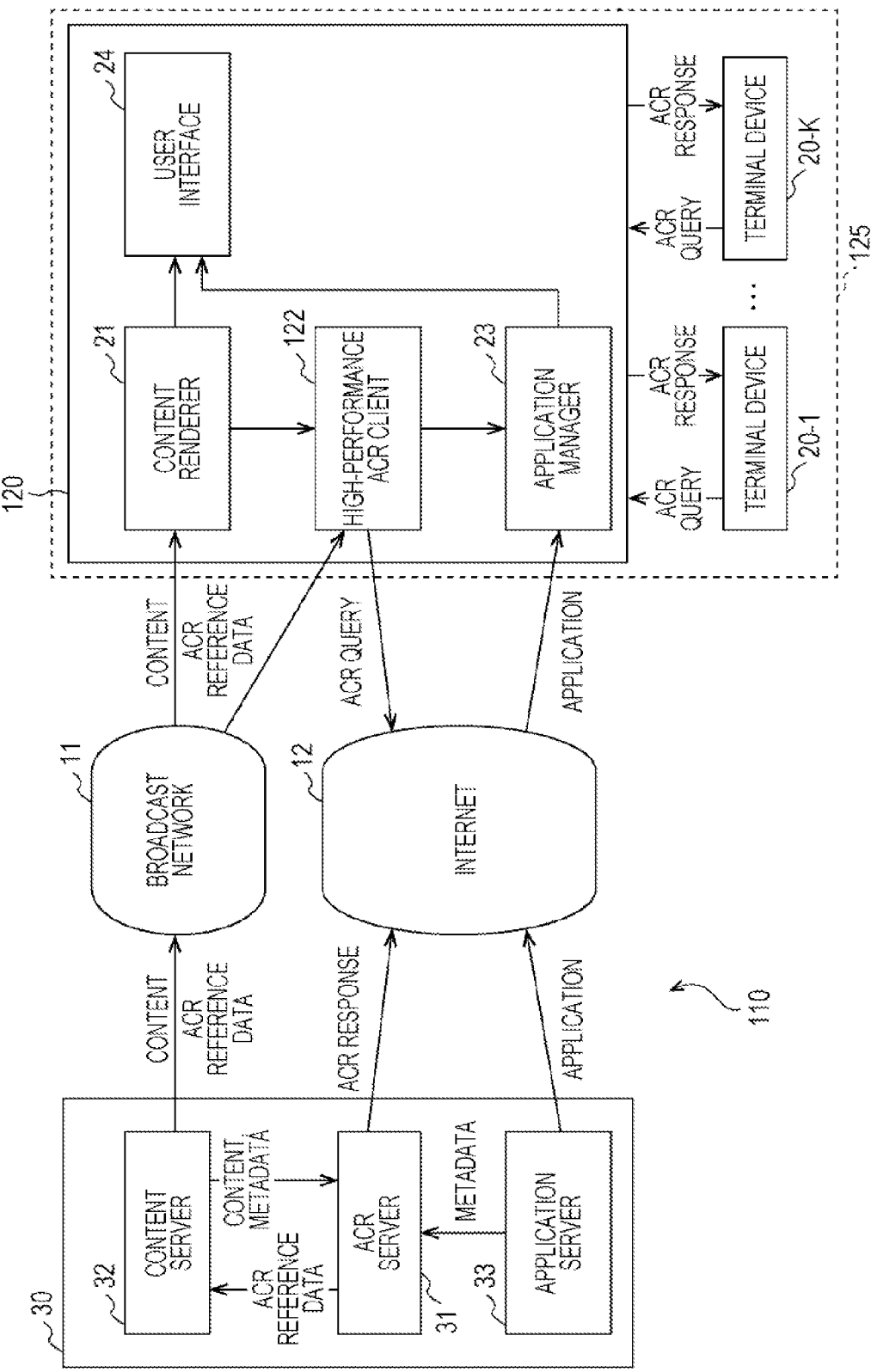
FIG. 9 is a block diagram of a second configuration example of a linked application supplying system which is an embodiment of the present disclosure.

FIG. 9 shows the second configuration example of the linked application supplying system which is the embodiment of the present disclosure.

The linked application supplying system 110 is intended to execute an application in conjunction with progress of content being viewed by a user in a TV receiver or the like, similar to the linked application supplying system 10 of FIG. 1.

In addition, among components of the linked application supplying system 110, the components common to the linked application supplying system 10 are denoted by the same reference numerals, and thus the description thereof will not be repeated.

The linked application supplying system 110 includes a plurality of terminal devices 20-1 to 20-K, a supply device 30, and a high-performance terminal device 120.

Similarly to the terminal device 20, the high-performance terminal device 120, while being built into a content reproduction device represented by a TV receiver, is disposed in a general house or the like.

The high-performance terminal device 120 and one or more terminal devices 20 form an ad hoc network 125 through a LAN or the Internet 12 in a wired or wireless manner. In addition, the ad hoc network 125 may include a plurality of high-performance terminal devices 120. Further, instead of the ad hoc network 125, the high-performance terminal device 120 and the terminal device 20 may form a P2P network.

In addition, it is assumed that the terminal device 20 constituting the ad hoc network 125 first transmits the generated ACR query 70 to the high-performance terminal device 120, and when the ACR response 90 is not returned from the high-performance terminal device 120, the terminal device 20 transmits the previous ACR query 70 to the ACR server 31.

Further, it is assumed that the ACR server 31 of the supply device 30 not only holds the generated ACR reference data 80 in the ACR database 53 built into itself, but also supplies the generated ACR reference data 80 to the content server 32 so as to be broadcasted through the broadcast network 11.

[Description of High-Performance Terminal Device 120]

The high-performance terminal device 120 is connected to the supply device 30 through the broadcast network 11 such as a TV broadcast network, a CATV network, an IPTV network and the Internet 12.

The high-performance terminal device 120 includes a content renderer 21, a high-performance ACR client 122, an application manager 23, and a user interface 24. In other words, in the high-performance terminal device 120, the ACR client 22 of the terminal device 20 is replaced with the high-performance ACR client 122.

The high-performance ACR client 122 operates similarly to the ACR server 31 in the ad hoc network 125, in addition to having the same operation as the ACR client 22.

[Detailed Configuration Example of High-Performance ACR Client 122]

Figure 10:
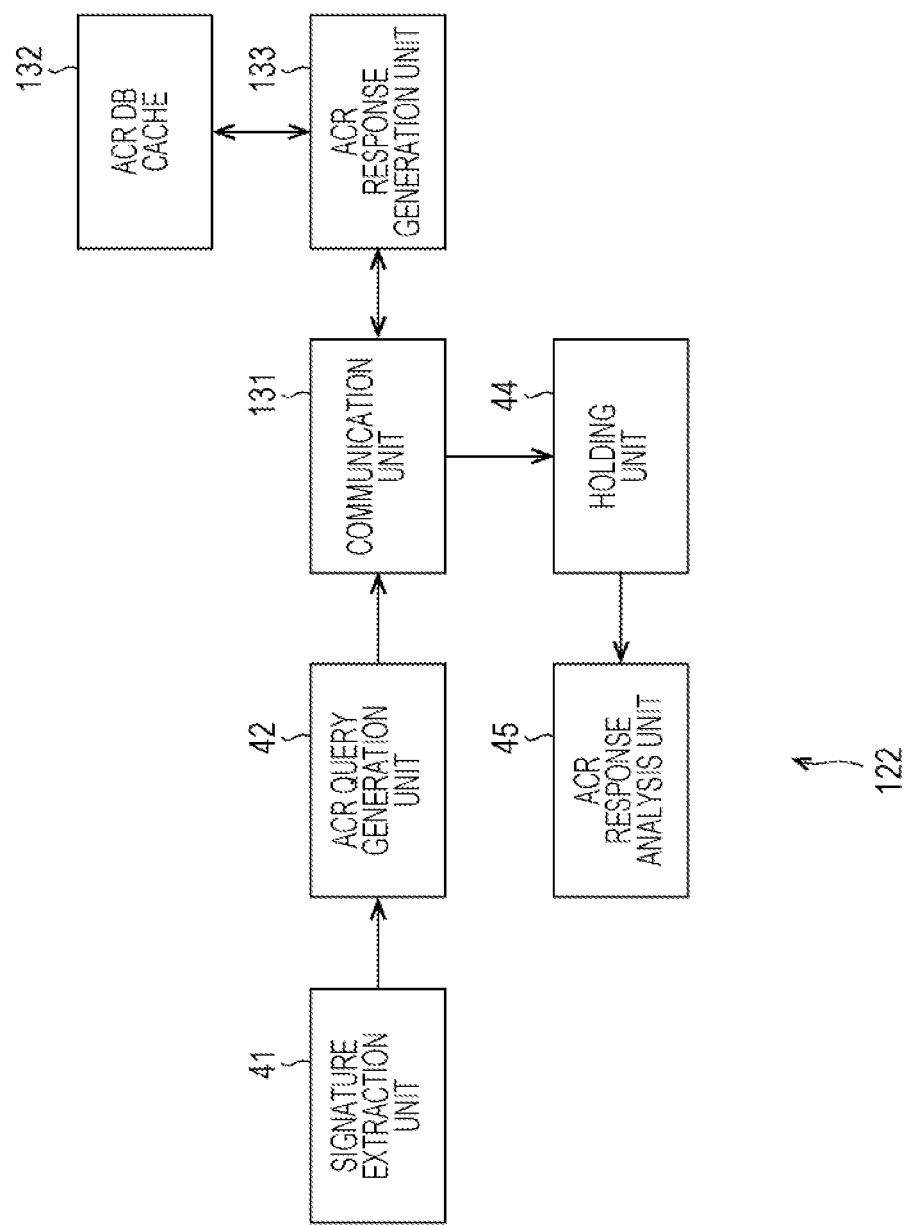
FIG. 10 is a block diagram showing a configuration example of a high-performance ACR client.

FIG. 10 shows a detailed configuration example of the high-performance ACR client 122 constituting the high-performance terminal device 120.

The high-performance ACR client 122 includes a signature extraction unit 41, an ACR query generation unit 42, a holding unit 44, an ACR response analysis unit 45, a communication unit 131, an ACR database (DB) cache 132, and an ACR response generation unit 133.

In other words, in the high-performance ACR client 122, the communication unit 131 is provided instead of the communication unit 43 of the ACR client 22 shown in the detailed configuration example of FIG. 2, and the ACR database cache 132 and the ACR response generation unit 133 are added.

Similarly to the communication unit 43 in FIG. 2, the communication unit 131 transmits the ACR query 70 generated by the ACR query generation unit 42 to the ACR server 31 of the supply device 30 through the Internet 12. Further, the communication unit 43 receives the ACR response 90 returned from the ACR server 31 and outputs the received ACR response 90 to the holding unit 44.

Further, the communication unit 131 receives the ACR query 70 transmitted from the terminal device 20 within the ad hoc network 125 and outputs the received ACR query 70 to the ACR response generation unit 133, and returns the ACR response 90 generated in the ACR response generation unit 133 to the corresponding terminal device 20.

The ACR database cache 132 acquires and holds the ACR reference data 80 which is generated in the ACR server 31 of the supply device 30 and transmitted through the broadcast network 11. However, due to the capacity of the ACR DB cache 132, the transmission timing of the ACR reference data 80 and the like, all pieces of ACR reference data 80 which have been held in the ACR database 53 of the ACR server 31 are not necessarily held in ACR database cache 132.

In addition, the high-performance ACR client 120 may acquire the ACR reference data 80 generated in the ACR server 31 of the supply device 30 from the ACR server 31 through the Internet 12.

Similarly to the ACR response generation unit 55 of the ACR server 31, the ACR response generation unit 133 identifies content corresponding to the signature data 74 included in the ACR query 70 transmitted from the terminal device 20 within the ad hoc network 125 by referring to the ACR reference data 80 of the ACR database cache 132. Further, even for the ACR query 70 generated by the ACR query generation unit 42 together with the ACR response generation unit 133 constituting the high-performance ACR client 122, the ACR response generation unit 133 can identify content corresponding to signature data 74 included therein.

Then, when the content is identified, the ACR response generation unit 133 generates the ACR response 90 including the content identifier 95, and the application identifier 97 as an identification result, and outputs the ACR response 90 to the notification unit 131. When the content is not identified, the ACR response generation unit 133 does not generate the ACR response 90. However, even when the content is not identified, the ACR response 90 indicating that the content is not identified (B in FIG. 7) may be generated.

[Operation of Linked Application Supplying System 110]

Figure 11:
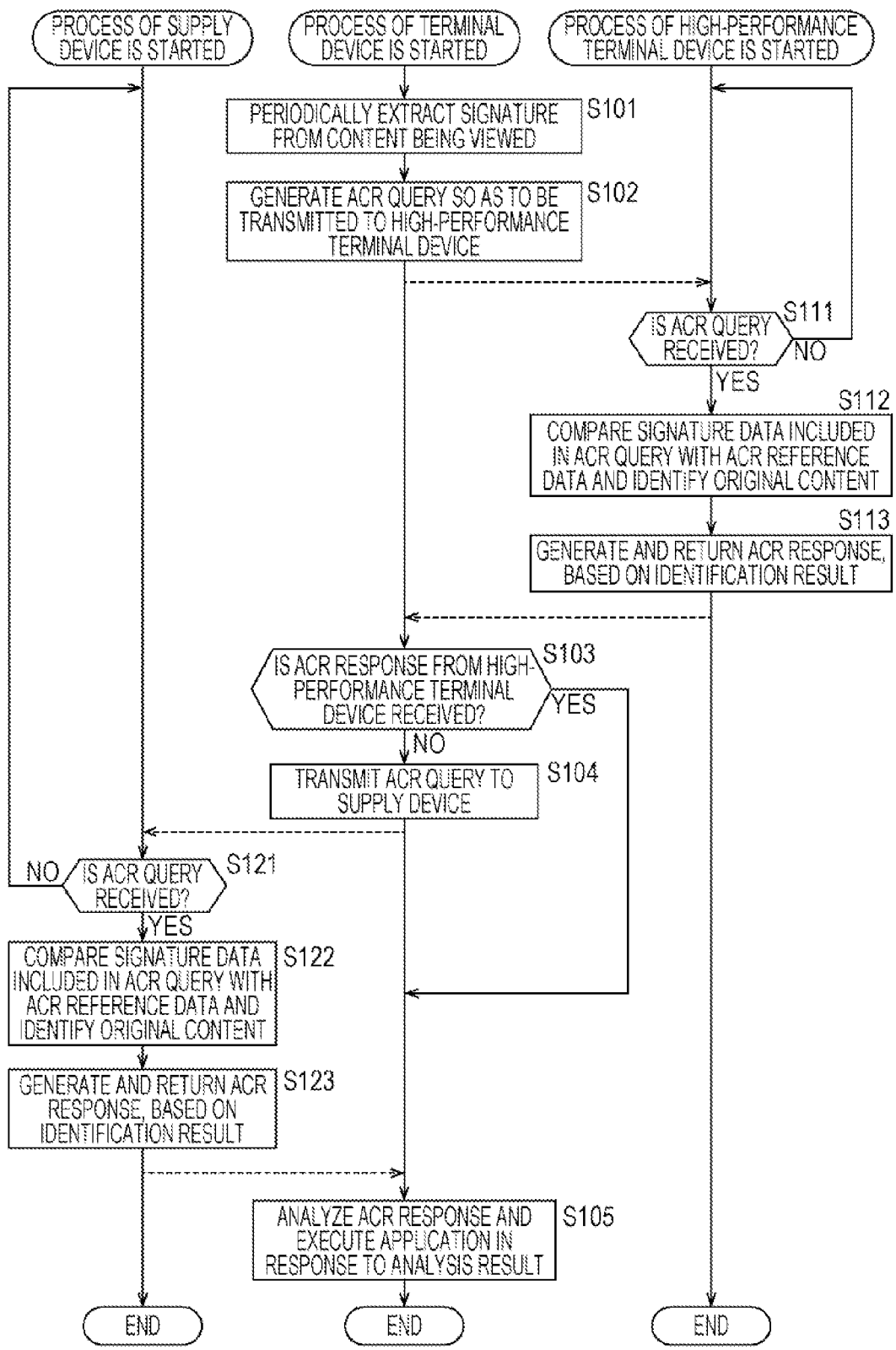
FIG. 11 is a flowchart describing an operation of the linked application supplying system shown in FIG. 10.

FIG. 11 is a flowchart describing the operation by the linked application supplying system 110 shown in FIG. 9.

In addition, as the premise of the operation description, it is assumed that the ACR reference data 80 which has been already generated is held in the ACR database 53 of the ACR server 31 constituting the supply device 30. Further, it is assumed that the ACR reference data 80 which is generated in the ACR server 31 and transmitted through the broadcast network 11 from the content server 32 is held in the ACR database cache 132 of the high-performance terminal device 120.

If content is reproduced by the TV receiver including the built-in terminal device 20, in other words, the user views the content by the TV receiver, in step S101, the content renderer 21 of the terminal device 20 transfers the content being viewed to be output to the ACR client 22. In the ACR client 22, the signature extraction unit 41 extracts signature data from the content being viewed in a predetermined sampling period and outputs the extracted signature data to the ACR query generation unit 42.

In step S102, the ACR query generation unit 42 generates an ACR query 70 including the signature data which is input from the signature extraction unit 41 and outputs the generated ACR query 70 to the communication unit 43. The communication unit 43 transmits the generated ACR query 70 to the high-performance terminal device 120 within the ad hoc network 125.

On the other hand, in step S111, the high-performance ACR client 122 of the high-performance terminal device 120 is on standby until the communication unit 131 receives the ACR query 70 transmitted from the ACR client 22 of the terminal device 20 within the ad hoc network 125. If the ACR query 70 is received by the communication unit 131, the process proceeds to step S112.

In step S112, the ACR response generation unit 133 of the high-performance ACR client 122 identifies the content corresponding to the signature data 74 included in the received ACR query 70, by referring to the ACR reference data 80 of the ACR database cache 132.

In step S113, the ACR response generation unit 133 generates the ACR response 90 in response to an identification result of the content. In other words, only when the content corresponding to the signature data 74 included in the ACR query 70 is identified, the ACR response 90 shown by A in FIG. 7 is generated. The communication unit 131 transmits the generated ACR response 90 to the ACR client 22 of the corresponding terminal device 20 within the ad hoc network 125. In addition, when the content is not identified, the ACR response 90 is not generated in the ACR response generation unit 133.

In step S103, the terminal device 20 which has transmitted the ACR query 70 to the high-performance terminal device 120 is on standby for a predetermined time until it receives the ACR response 90 from the high-performance ACR client 122 of the high-performance terminal device 120. When the ACR response 90 is received during the predetermined standby time, the process proceeds to step S105 and the process based on the ACR response 90 (the same as the afore-mentioned process of step S3 in FIG. 8) is performed by the ACR client 22 of the terminal device 20.

On the contrary, in step S103, when the ACR response 90 is not received during the predetermined standby time, the process proceeds to step S104.

In step S104, the communication unit 43 of the terminal device 20 transmits the ACR query 70 generated in step S101 to the ACR server 31 of the supply device 30 through the Internet 12. In addition, at this time, the ACR query 70 may be generated and transmitted again.

On the other hand, in step S121, the ACR server 31 of the supply device 30 is on standby until the communication unit 54 receives the ACR query 70 transmitted from the ACR client 22 of the terminal device 20. If the ACR query 70 is received by the communication unit 54, the process proceeds to step S122.

In step S122, the ACR response generation unit 55 identifies the content corresponding to the signature data 74 included in the received ACR query 70, by referring to ACR reference data 80 of the ACR database 53.

In step S123, the ACR response generation unit 55 generates the ACR response 90 in response to an identification result of the content. In other words, when the content corresponding to the signature data 74 included in the ACR query 70 is identified, the ACR response 90 shown by A in FIG. 7 is generated, but when the content is not identified, the ACR response 90 shown by B in FIG. 7 is generated. The communication unit 54 transmits the generated ACR response 90 to the ACR client 22 of the terminal device 20 through the Internet 12.

If the ACR response 90 is received and held by the ACR client 22, the process of step S105 is performed. In other words, the ACR response analysis unit 45 analyzes the held ACR response 90 to specify the application to be executed in association with the progress of the content being viewed, and notifies the application manager 23 of the application identifier 97 and the content identifier 95. According to the notification, the application manager 23 acquires the application represented by the application identifier 97 from the application server 33 through the Internet 12 and executes the application.

Further, the application manager 23 gives the content identifier 95 and the application identifier 97 as arguments to any associated metadata acquisition API to acquire associated metadata 98 corresponding to the executed application from the ACR client 22.

The operations described above are repeatedly performed while the content is viewed. Thus, this allows the processing load of the ACR server 31 to be dispersed to the high-performance terminal device 120.

However, the terminal device 20, the supply device 30, and the high-performance terminal device 120, which perform the series of processes described above, can be realized by a computer executing software, as well as being respectively configured by hardware. The computer includes a computer that is built into dedicated hardware, or for example, a general-purpose personal computer capable of executing various functions by installing various types of programs.

Figure 12:
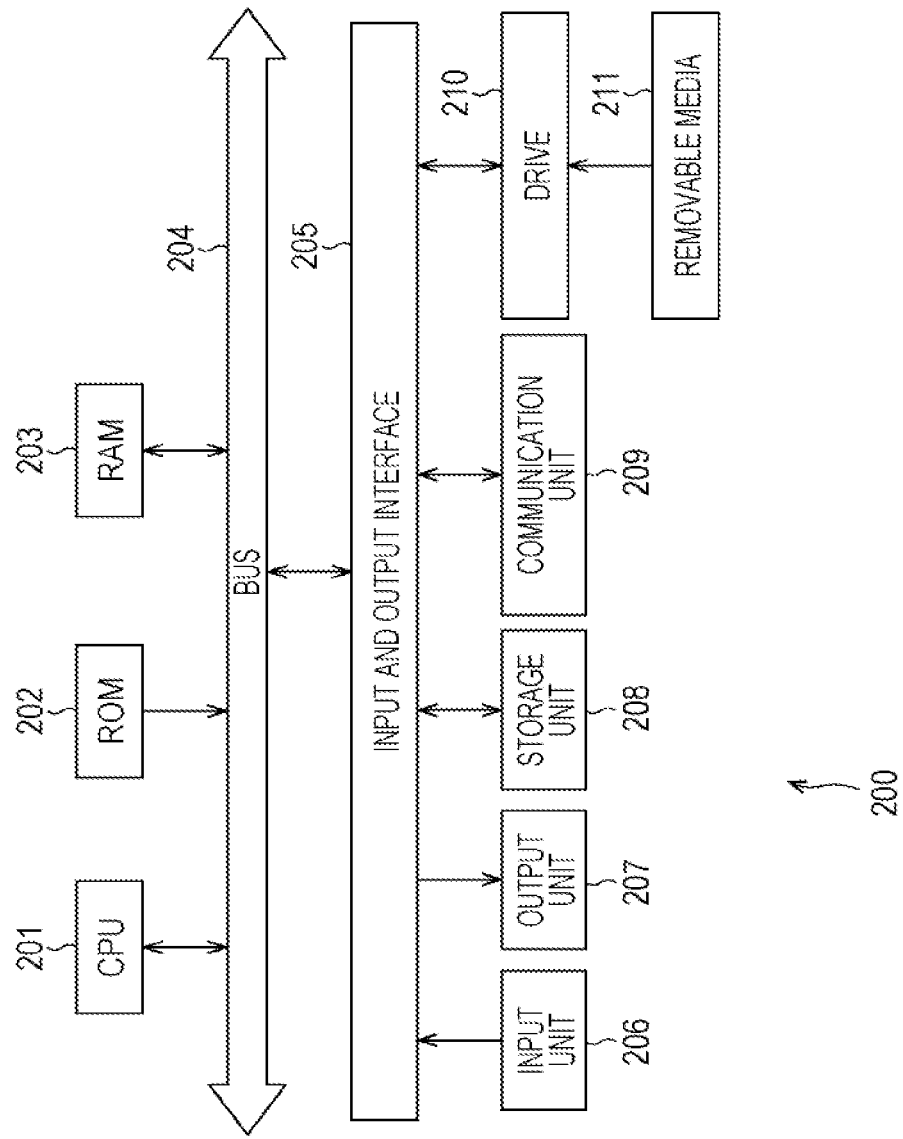
FIG. 12 is a block diagram showing a configuration example of a computer.

FIG. 12 is a block diagram showing a configuration example of hardware of the computer described above.

In the computer 200, a Central Processing Unit (CPU) 201, a Read Only Memory (ROM) 202, and a Random Access Memory (RAM) 203 are connected with each other through a bus 204.

Further, an input and output interface 205 is connected to the bus 204. An input unit 206, an output unit 207, a storage unit 208, a communication unit 209, and a drive 210 are connected to the input and output interface 205.

The input unit 206 includes a keyboard, a mouse, a microphone, and the like. The output unit 207 includes a display, a speaker, and the like. The storage unit 208 includes a hard disk drive, a non-volatile memory, and the like. The communication unit 209 includes a network interface, and the like. The drive 210 drives a removable media 211 such as a magnetic disk, an optical disk, a magneto-optical disk, or a semiconductor memory.

The computer 200 configured as described above executes the series of processes described above by the CPU 201 loading the program stored, for example, in the storage unit 208 on the RAM 203 through the input and output interface 205 and the bus 204, and executing the loaded program.

The program the computer 200 (CPU 201) executes may be provided while being recorded on a removable media 211 as, for example, a package media, or the like. Further, the program may be provided through a wired or wireless transmission medium such as a local area network, the Internet, and a digital satellite broadcast.

In the computer 200, a program may be installed in the storage unit 208 through the input and output interface 205 by mounting the removable media 211 in the drive 210. Further, the program may be received by the communication unit 209 through a wired or wireless transmission medium, and installed in the storage unit 208. Alternatively, the program may be installed in advance in the ROM 202 and the storage unit 208.

In addition, the program that the computer 200 executes may be a program in which processes are performed in a time series in the order described in this specification, or programs which are executed in parallel or at a necessary timing such as the time when calling is performed.

In addition, embodiments of the present disclosure are not limited to the embodiments described above, but various modifications are possible without departing from the scope of the present disclosure.

REFERENCE SIGNS LIST

10 LINKED APPLICATION SUPPLYING SYSTEM
20 TERMINAL DEVICE
21 CONTENT RENDERER
22 ACR CLIENT
23 APPLICATION MANAGER
24 USER INTERFACE
30 SUPPLY DEVICE
31 ACR SERVER
32 CONTENT SERVER
33 APPLICATION SERVER
41 SIGNATURE EXTRACTION UNIT
42 ACR QUERY GENERATION UNIT
43 COMMUNICATION UNIT
44 HOLDING UNIT
45 ACR RESPONSE ANALYSIS UNIT
51 CONTENT ACQUISITION UNIT
52 SIGNATURE EXTRACTION UNIT
53 ACR DATABASE
54 COMMUNICATION UNIT
55 ACR RESPONSE GENERATION UNIT
70 ACR QUERY
80 ACR REFERENCE DATA
90 ACR RESPONSE
110 LINKED APPLICATION SUPPLYING SYSTEM
120 HIGH-PERFORMANCE TERMINAL DEVICE
122 HIGH-PERFORMANCE ACR CLIENT
131 COMMUNICATION UNIT
132 ACR DATABASE CACHE
133 ACR RESPONSE GENERATION UNIT
200 COMPUTER
201 CPU

The invention claimed is:

1. A terminal device connectable to a content reproduction device, said terminal device comprising:
a memory having a program stored therein;
a central processing unit (CPU) configured to, during operation, execute the program stored in the memory, in which upon execution of the program, the CPU causes
(i) signature data representing characteristics of content being reproduced to be extracted from the content being reproduced,
(ii) a first query including at least the extracted signature data to be generated,
(iii) the generated first query to be transmitted for receipt by a server device,
(iv) an application, corresponding to an application identifier included in a received first response which is returned by the server device in response to the first query, to be acquired and executed,
(v) reference data, in which signature data that is held in a database of the server device and represents characteristics of content extracted from the content is associated with a content identifier representing the content of an extraction source and an application identifier representing an application to be executed in conjunction with the content, to be acquired and held, and
(vi) content to be identified of an extraction source of signature data included in a second query in response to the second query transmitted from a separate terminal device belonging to a common network, by referring to the reference data, and to generate a second response to be returned to the separate terminal device, including at least the application identifier representing an application to be executed in conjunction with the identified content.

2. The terminal device according to claim 1, in which upon execution of the program, the CPU further causes
content to be identified of an extraction source of signature data included in the first query, by referring to the reference data, and to generate a third response including at least the application identifier representing an application to be executed in conjunction with the identified application, and
an application corresponding to an application identifier included in the generated third response to be acquired and executed.

3. The terminal device according to claim 2,
wherein the generated first query includes at least the extracted signature data and an extraction time stamp representing a timing when the signature data is extracted, and
wherein the executed application acquires associated metadata which is selected by the server device based on the extraction time stamp which is included in the received second response, and performs a predetermined process.

4. The terminal device according to claim 2,
wherein the terminal device is built into the reproduction device which reproduces content, and
wherein upon execution of the program, the CPU further causes all pieces of content which are reproduced by the reproduction device to be supplied to the terminal device.

5. An information processing method for use with a terminal device having a central processing unit (CPU), said terminal device connectable to a content reproduction device, said method comprising:
causing, by use of the CPU,
(i) signature data representing characteristics of content being reproduced to be extracted from the content being reproduced,
(ii) a first query including at least the extracted signature data to be generated,
(iii) the generated first query to be transmitted for receipt by a server device,
(iv) an application, corresponding to an application identifier included in a received first response which is returned by the server device in response to the first query, to be acquired and executed,
(v) reference data, in which signature data that is held in a database of the server device and represents characteristics of content extracted from the content is associated with a content identifier representing the content of an extraction source and an application identifier representing an application to be executed in conjunction with the content, to be acquired and held, and
(vi) content to be identified of an extraction source of signature data included in a second query in response to the second query transmitted from a separate terminal device belonging to a common network, by referring to the reference data, and to generate a second response to be returned to the separate terminal device, including at least the application identifier representing an application to be executed in conjunction with the identified content.

6. A non-transitory computer readable medium having stored thereon a program to cause a computer of a terminal device connectable to a content reproduction device to perform a method, said method comprising:
causing signature data representing characteristics of content being reproduced to be extracted from the content being reproduced;
causing a first query including at least the extracted signature data to be generated;
causing the generated first query to be transmitted for receipt by a server device;
causing an application, corresponding to an application identifier included in a received first response which is returned by the server device in response to the first query, to be acquired and executed;
causing reference data, in which signature data that is held in a database of the server device and represents characteristics of content extracted from the content is associated with a content identifier representing the content of an extraction source and an application identifier representing an application to be executed in conjunction with the content, to be acquired and held; and
causing content to be identified of an extraction source of signature data included in a second query in response to the second query transmitted from a separate terminal device belonging to a common network, by referring to the reference data, and to generate a second response to be returned to the separate terminal device, including at least the application identifier representing an application to be executed in conjunction with the identified content.

7. A linked application supplying system comprising a terminal device and a server device,
wherein the terminal device includes:
a memory having a program stored therein;
a central processing unit (CPU) configured to, during operation, execute the program stored in the memory, in which upon execution of the program, the CPU causes (i) signature data representing characteristics of content being reproduced to be extracted from the content being reproduced,
(ii) a first query including at least the extracted signature data to be generated,
(iii) the generated first query to be transmitted for receipt by the server device,
(iv) an application, corresponding to an application identifier included in a received first response which is returned by the server device in response to the first query, to be acquired and executed,
(v) reference data, in which signature data that is held in a database of the server device and represents characteristics of content extracted from the content is associated with a content identifier representing the content of an extraction source and an application identifier representing an application to be executed in conjunction with the content, to be acquired and held, and
(vi) content to be identified of an extraction source of signature data included in a second query in response to the second query transmitted from a separate terminal device belonging to a common network, by referring to the reference data, and to generate a second response to be returned to the separate terminal device, including at least the application identifier representing an application to be executed in conjunction with the identified content;
wherein the server device includes:
a second memory to hold the reference data;
a second CPU configured to, during operation, cause content to be identified of an extraction source of signature data included in the first query transmitted from the terminal device, by referring to the reference data, and to generate the first response including at least the application identifier representing an application to be executed in conjunction with the identified content; and
a communication interface to transmit the generated first response to the terminal device and to supply the reference data held in the second memory to the terminal device through a predetermined network.

* * * * *